United States Patent
Oswal et al.

(10) Patent No.: US 11,218,916 B2
(45) Date of Patent: Jan. 4, 2022

(54) INTERFREQUENCY HANDOVERS IN SHARED SPECTRUM LTE/5G SYSTEMS USING WI-FI BASED LOCATION

(71) Applicant: Cisco Technology, Inc., San Jose, CA (US)

(72) Inventors: Anand Oswal, Pleasanton, CA (US); Rajesh S. Pazhyannur, Fremont, CA (US); Arun G. Khanna, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/865,910

(22) Filed: May 4, 2020

(65) Prior Publication Data

US 2021/0112461 A1    Apr. 15, 2021

Related U.S. Application Data

(60) Provisional application No. 62/912,802, filed on Oct. 9, 2019.

(51) Int. Cl.
| | | |
|---|---|---|
| *H04W 4/00* | (2018.01) | |
| *H04W 36/00* | (2009.01) | |
| *H04W 76/11* | (2018.01) | |
| *H04W 80/02* | (2009.01) | |

(52) U.S. Cl.
CPC . *H04W 36/0022* (2013.01); *H04W 36/00835* (2018.08); *H04W 76/11* (2018.02); *H04W 80/02* (2013.01)

(58) Field of Classification Search
CPC ......... H04W 4/02; H04W 4/029; H04W 4/30; H04W 4/33; H04W 36/0022; H04W 36/0083; H04W 36/00835; H04W 76/11; H04W 80/02
See application file for complete search history.

(56) References Cited

U.S. PATENT DOCUMENTS

| | | | |
|---|---|---|---|
| 6,393,279 B1 * | 5/2002 | Lee | H04W 36/24 455/426.1 |
| 9,374,727 B2 | 6/2016 | Dural et al. | |
| 2009/0005052 A1 * | 1/2009 | Abusch-Magder | H04W 24/02 455/446 |
| 2014/0079007 A1 * | 3/2014 | Li | H04W 76/16 370/329 |

(Continued)

FOREIGN PATENT DOCUMENTS

WO    2019/068628 A1    4/2019

*Primary Examiner* — Matthew W Genack
(74) *Attorney, Agent, or Firm* — Polsinelli PC

(57) ABSTRACT

Technologies for attestation techniques, systems, and methods to that reduces handover delay between LTE/5G eNBs by leveraging Wi-Fi for determining UE location. The systems, methods and computer-readable storage media disclosed here in may operate in the following deployments: the User Equipment (UE) is connected to enterprise Wi-Fi system in addition to being connected to private LTE/5G; enterprise Wi-Fi system having indoor location enabled; and the location system provides an API to give indoor location of the UE; and wherein Wi-Fi AP and LTE eNBs can communicate with each other, which can be accomplished in one instance wherein the two are co-located.

20 Claims, 6 Drawing Sheets

(56) References Cited

U.S. PATENT DOCUMENTS

| | | | |
|---|---|---|---|
| 2014/0171097 A1* | 6/2014 | Fischer | G01S 5/0242 455/456.1 |
| 2015/0065138 A1 | 3/2015 | Chen et al. | |
| 2015/0312818 A1* | 10/2015 | Yiu | H04W 36/0094 455/436 |
| 2017/0367107 A1 | 12/2017 | Comsa et al. | |
| 2019/0200270 A1 | 6/2019 | Yu et al. | |

* cited by examiner

US 11,218,916 B2

INTERFREQUENCY HANDOVERS IN SHARED SPECTRUM LTE/5G SYSTEMS USING WI-FI BASED LOCATION

CROSS-REFERENCE TO RELATED APPLICATIONS

This application claims priority to U.S. Provisional Patent Application No. 62/912,802, filed on Oct. 9, 2019, the content of which is incorporated herein by reference in its entirety.

TECHNICAL FIELD

The present disclosure generally relates to the field of Wi-Fi and 5G interworking and more specifically with respect to reducing handover delay between LTE/5G eNBs by leveraging Wi-Fi for determining UE location.

BACKGROUND

The radio access network (RAN) has been in use since the beginning of cellular technology and has evolved through the generations of mobile communications (1G through 5G). Components of the RAN include a base station and antennas that cover a given region depending on their capacity. Access Points (hereafter called access points, or abbreviated as APs) provide a secure, affordable, and easy-to-use wireless Local Area Network (LAN) solution that combines mobility and flexibility with the enterprise-class features required by networking professionals. An access point serves as the connection point between wireless and wired networks or as the center point of a stand-alone wireless network. In large installations, wireless users within the radio range of an access point can roam throughout a facility while maintaining seamless, uninterrupted access to the network. Each access point platform may contain one or more radios.

In the Universal Mobile Telecommunications System (UMTS) and 3GPP Long Term Evolution (LTE), user equipment (UE) is any device used directly by an end-user to communicate. It can be a hand-held telephone, a laptop computer equipped with a mobile broadband adapter, or any other device. The UE may connect to a base station Node B, such as an eNode B (eNB) or gNode B (gNB). Typically, shared spectrum LTE/5G systems are organized so that if two Node Bs have overlapping coverage, they would operate at different frequencies or channels so that there is no interferences for the UEs they serve. Therefore, neighboring Node Bs would have different channel frequencies. However, when the UE roams and needs to move to another Node B, the UE needs to know which frequency it should scan. Thus, typically, a list of frequencies that the UE should scan is provided by a serving Node B that the UE is first connected to. Potentially, the UE has a long list of frequencies to scan.

A side effect of this is that it increases handover delays in deployments where the Node B has multiple neighbors. If a Node B has K neighbors, then all K neighbors would be provisioned on the UE. The worst case for handover is where all K neighbors have different channels at the time of handover such that the UE has to scan for all K different channels. In LTE/5G inter-frequency channel scans take time and this in turn adversely affects transmissions quality, such as voice quality when handovers occur during a voice call. Therefore, there exists a need for systems and methods for minimizing a handover delay.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

Figure 1A:
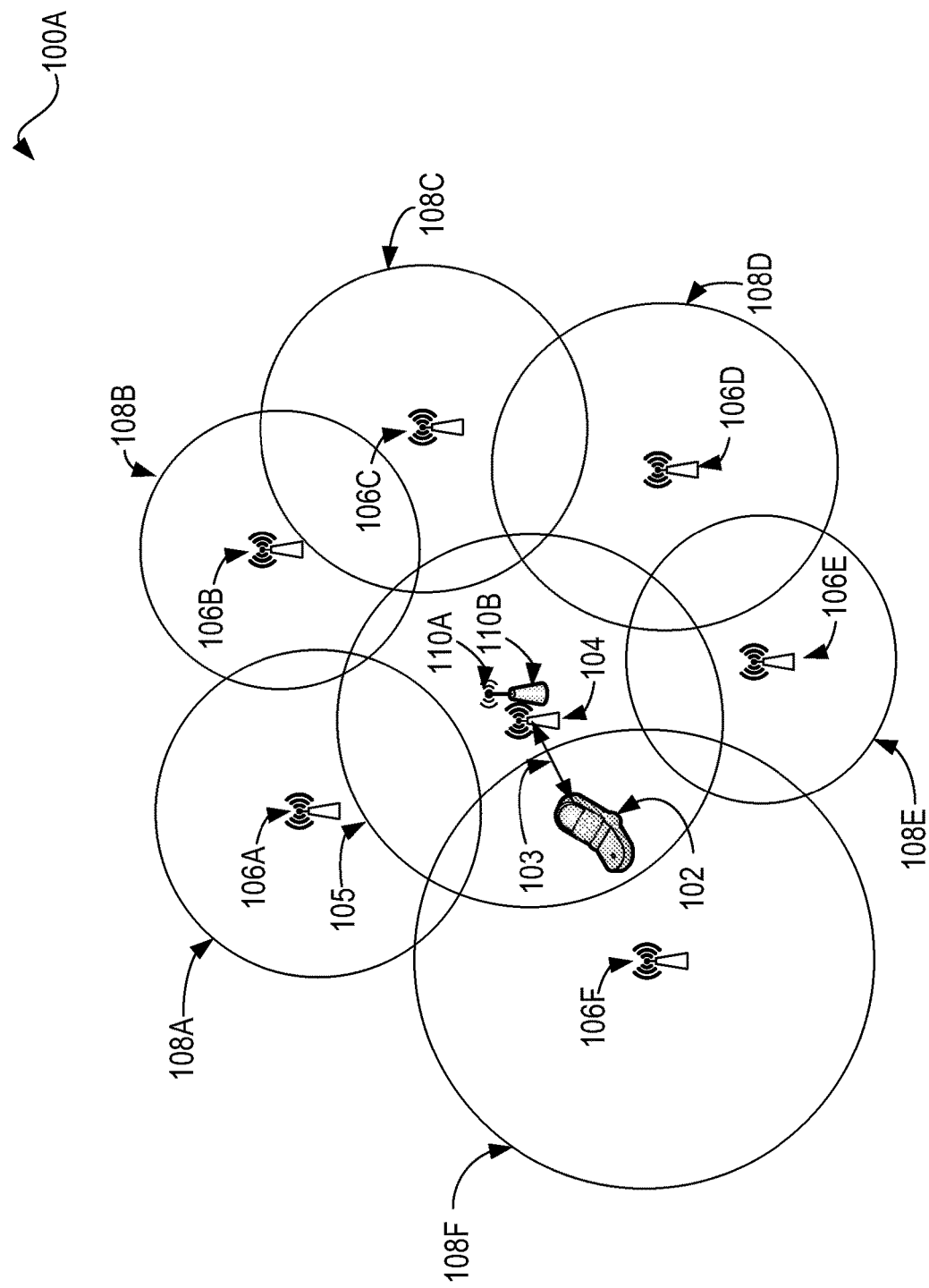
FIGS. 1A and 1B illustrate an example schematic of a UE moving from one location to another wherein the UE needs to be handed over to a different Node B, according to an aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods and computer-readable storage media for reducing the time to complete interfrequency handovers by leveraging Wi-Fi to determine a User Equipment (UE) location in order to more efficiently handover to the appropriate LTE/5G eNB/gNB (hereinafter called Node Bs). An example method can include subscribing, by a serving Node B, with a Wi-Fi Positioning System (WPS) associated with a Wi-Fi Access Point, to receive one or more tracked locations of a User Equipment (UE), the Wi-Fi Access Point being co-located relative to the Serving Node B; receiving, from the WPS, a tracked location of the UE; determining, by the serving Node B, a list of current neighboring Node Bs, the list of current neighboring Node Bs comprising one or more Node Bs located within a threshold proximity to the UE; pruning, by the serving Node B and based on the list of current neighboring node Bs, a list of neighboring node Bs available at the serving Node B by excluding one or more Node Bs that operate in a frequency or channel that is different than frequencies or channels of neighboring Node Bs in the list of current neighboring Node Bs; and providing the pruned list of neighboring Node Bs and/or associated frequencies (of neighboring Node Bs) to the UE.

In some cases, the example method may further include providing, by the serving Node B to the UE, a C-RNTI (Cell Radio Network Temporary Identifier) when the UE connects to the serving Node B; and receiving, from the UE, a mapping between a media access control (MAC) address of the UE and the C-RNTI of the UE prior to subscribing to the tracked location of the UE. In some cases, the example method may further include providing the MAC address to the WPS, wherein subscribing to the tracked location is based on providing the MAC address to the WPS. Subscribing to the tracked location may be based on providing the C-RNTI to the WPS. In some cases, the WPS can keep track of both the MAC address and C-RNTI with respect to the UE.

In some examples, determining the list of current neighboring Node Bs, pruning the list neighboring of node Bs provided by the serving Node B, and providing the pruned list of neighboring Node Bs may be in response to a determination that the UE has moved from a first location to a second location covered by a different set of Node Bs than the first location. In some cases, receiving the tracked location of the UE can include identifying the UE based on the mapping between the MAC address of the UE and the C-RNTI of the UE. The threshold proximity may be less than a service range of the Serving Node B. Subscribing to the tracked location may depend on the list of current neighboring Node Bs including more than a threshold number of Node Bs with different frequencies.

This overview is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

Example Embodiments

Figure 1B:
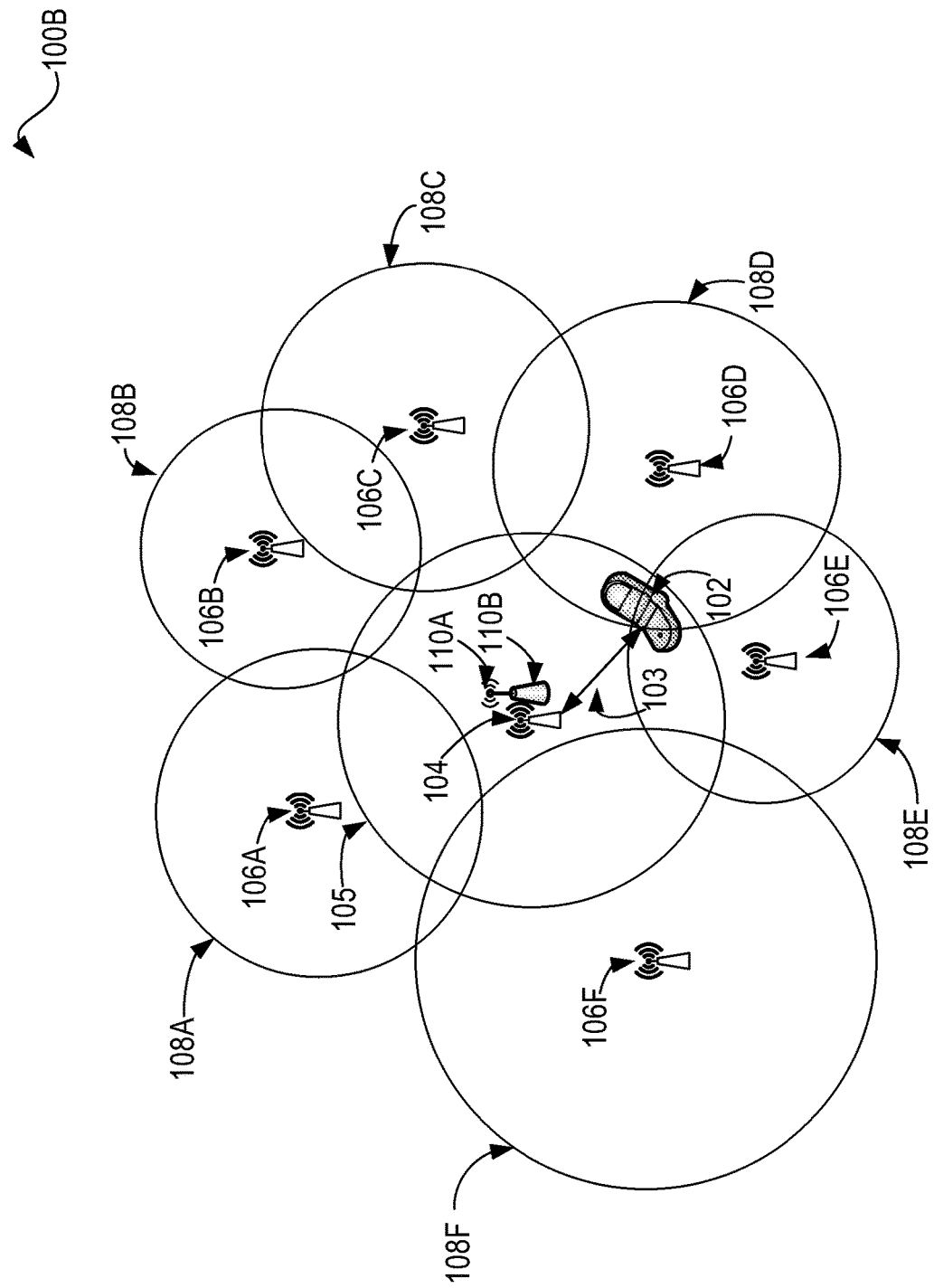

The disclosure begins with FIGS. 1A and 1B illustrating an example network 100 (100A, 100B) wherein an administrative domain for Wi-Fi and LTE/5G is the same and shares traffic into a network fabric. Starting with FIG. 1A, the example network 100A illustrates a UE 102 forming a first connection 103 with a serving Node B 104 having a service range 105. The serving Node B 104 may have neighboring Node Bs 106 (106A, 106B, 106C, 106D, 106E, 106F, etc.) each having their respective service ranges 108 (108A, 108B, 108C, 108D, 108E, 108F, etc.).

When the UE 102 roams, the UE 102 may end up leaving the service range 105 of the serving Node B 104 or may enter a service range of a neighboring Node B 106 that can establish a better connection to the UE 102. In such cases, the UE 102 can try to determine which of the neighboring Node Bs 106 to connect to by scanning the frequencies of its neighboring Node Bs 106. Typically, a list of frequencies that the UE 102 should scan is provided by the serving Node B 104 that the UE 102 is connected to. However, potentially, the UE 102 can have a long list of frequencies to scan if each (or some) of the frequencies of the neighboring Node Bs 106 are different. Assuming all of the frequencies of the neighboring Node Bs 106 shown in FIG. 1A are different, the list would include 6 different frequencies to scan. Since each scan can take a certain amount of time, such as 20 to 30 milliseconds, the more scans that are performed the longer the delay, which can negatively impact user experience and result in inefficient lag time.

If, for example, the UE 102 roams to a location shown in FIG. 1B, the handover delay could be reduced if the UE 102 does not need to scan the frequencies associated with the neighboring Node Bs 106A, 106B, 106C, and 106F. However, the serving Node B 104 typically does not know the location of the UE 102. In some cases, the UE 102 can only be identified using a Cell Radio Network Temporary Identifier (C-RNTI) which does not indicate the location of the UE 102. However, if there is a Wi-Fi Access Point (AP) 110A co-located to the serving Node B 104, the location of the UE 102 may be determined by leveraging a Wi-Fi positioning system (WPS) 110B that uses the Wi-Fi AP's 110A position and other surrounding Wi-Fi APs to determine the location of the UE 102.

Figure 2:
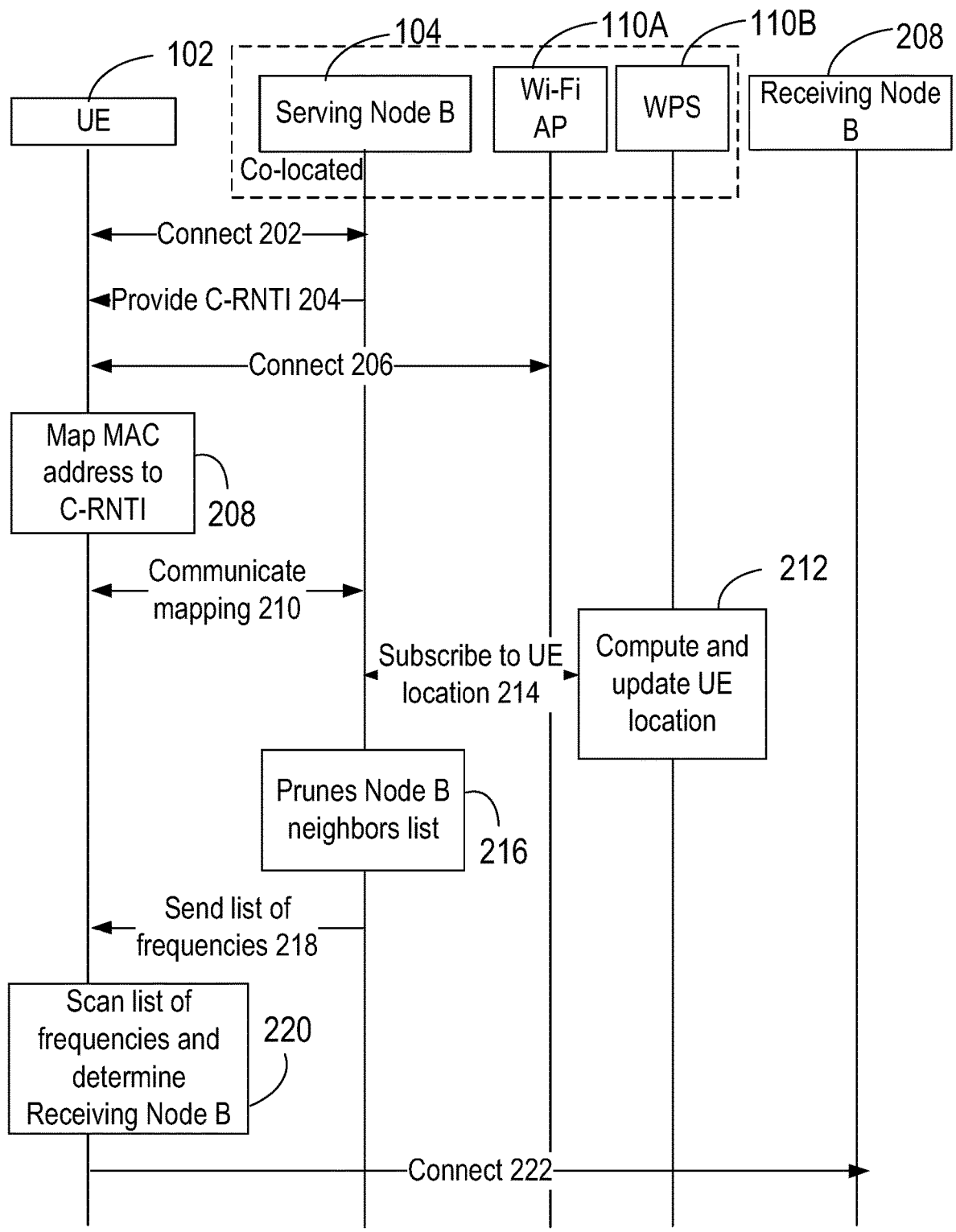
FIG. 2 illustrates an example flow diagram of an UE interfrequency handover between Wi-Fi and 5G from a serving Node B to a receiving Node B, according to an aspect of the present disclosure

Therefore, as shown in a flow diagram 200 in FIG. 2, after the UE 102 connects (202) to the serving Node B 104, the serving Node B 104 provides (204) to the UE 102 a C-RNTI. Then, after the UE 102 connects (206) to the Wi-Fi AP 110A, the UE 102 maps (208) the MAC address of the UE 102 to the C-RNTI. Then, the UE 102 communicates (210) a mapping between the UE MAC address and the provided C-RNTI to the serving Node B 104. The WPS 110B then computes and updates (212) the UE 102 location, wherein the serving Node B 104 subscribes (214) to location updates of the UE 102 by providing the MAC address to receive an updated location of the UE 102 or, assuming the WPS 110B keeps track of the UE 102 based on both the MAC address and the C-RNTI, providing the C-RNTI to receive the updated location of the UE 102. The serving Node B 104 then prunes (216) a list of frequencies associated with the list of current neighboring Node Bs to remove any frequencies associated with neighboring Node Bs that are not within a threshold proximity of the updated location of the UE 102. Then, the serving Node B 104 sends the pruned list of frequencies to the UE 102 to scan. The UE 102 then scans (220) and determines which neighboring Node B has the strongest signal and connects (222) to a receiving Node B.

In some cases, determining the list of current neighboring Node Bs, pruning a list of neighboring Node Bs based on the list of current neighboring Node Bs, and providing the pruned list of neighboring Node Bs can be in response to a determination that the UE 102 has moved from a first location to a second location covered by a different set of Node Bs than the first location. Moreover, in some examples, receiving the location of the UE 102 and the tracked or updated location of the UE 102 can include identifying the UE 102 based on the mapping of the MAC address of the UE 102 with the C-RNTI of the UE 102.

Figure 3:
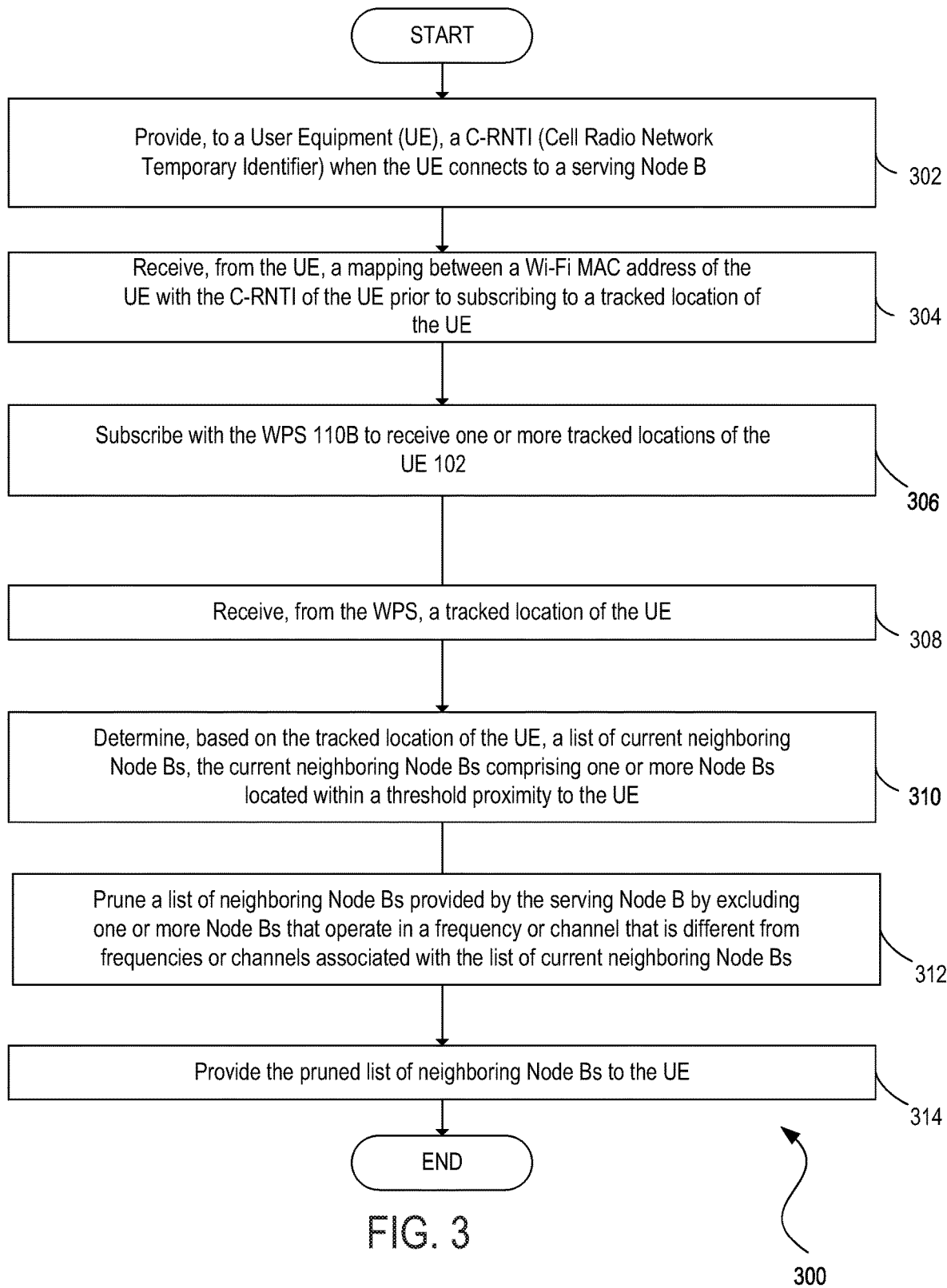
FIG. 3 illustrates an example method for UE interfrequency handover between Wi-Fi and 5G from a serving Node B to a receiving Node B, according to an aspect of the present disclosure.

FIG. 3 illustrates an example method 300 for reducing handover delay between LTE/5G eNBs by leveraging Wi-Fi for determining UE location. In this example, the serving Node B 104 may provide (302), to the UE 102 the C-RNTI when the UE 102 connects to the serving Node B 104. The serving Node B 104 may receive (304), from the UE 102, a mapping between the MAC address of the UE 102 and the C-RNTI of the UE 102. In some examples, the serving Node B 104 may receive the mapping prior to subscribing to receive the tracked location of the UE 102. The serving Node B 104 may send the MAC and/or C-RNTI to the WPS 110B or a request to subscribe. In some examples, the serving Node B 104 can send to the WPS 110B a request to subscribe that includes the MAC and/or C-RNTI. The WPS 110B may subscribe the serving Node B 104 to the tracked location of the UE 102 based on the MAC and/or C-RNTI. In this example, the WPS 110B is associated with a Wi-Fi AP 110A being co-located relative to the Serving Node B 104. In other words, the service Node B 104 subscribes (306) with the WPS 110B to receive one or more tracked locations of the UE 102. In some cases, whether the serving Node B 104 subscribes to the tracked location may depend on whether the list of current neighboring Node Bs includes more than a threshold number of Node Bs with different frequencies.

The serving Node B 104 may then receive (308), from the WPS 110B, the tracked location of the UE 102. For example, the tracked location may be some location relative to the location of the Wi-Fi AP 110A. In some examples, the tracked location can be calculated based on the Wi-Fi range of the Wi-Fi AP 110A, and/or Wi-Fi interactions between the UE 102 and the WPS 110B and/or the Wi-Fi AP 110A. The WPS 110B may serve as a compute engine of a datacenter by collecting samples (e.g., of RF from the UE 102) collected by one or more of the Wi-FI APs 110A. The WPS 11B may then compute the location of the UE 102 using techniques like triangulation, etc. In some examples, the WPS 110B can determine the location of the UE 102 based on the connection of the UE 102 to the Wi-Fi AP 110A and the known location (known by the WPS 110B) of the Wi-Fi AP 110A. Thus, knowing that the UE 102 is connected to the Wi-Fi AP 110A, the WPS 110B can infer the location of the UE 102 based on the location of the Wi-Fi AP 110A. Accordingly, in some cases, the inferred location of the UE 102 can be relative to the Wi-Fi AP 110A. In some cases, the WPS 110B can determine the location of the UE 102 with additional granularity based on the wireless range of the Wi-Fi AP 110A. Moreover, in some examples, localization techniques used for positioning with the Wi-Fi AP 110A may be based on measuring the intensity of the received signal (e.g., received signal strength indication (RSSI)).

The serving Node B 104 may determine (310), based on the tracked location of the UE 102, a list of current neighboring Node Bs. The current neighboring Node Bs can include one or more Node Bs located within a threshold proximity to the UE 102. The threshold proximity may be set as less than the service range 105 of the serving Node B 104. The serving Node B 104 may prune (312) a list of neighboring Node Bs provided by the serving Node B 104 to exclude Node Bs that operate in a respective frequency or channel that is different from frequencies or channels associated with the neighboring Node Bs of the list of current neighboring Node Bs. The serving Node B 104 may then provide (314) the pruned list of neighboring Node Bs to the UE 102.

Furthermore, in some examples, determining the list of current neighboring Node Bs, pruning a list of neighboring node Bs provided by the serving Node B, and providing the pruned list of neighboring Node Bs can be in response to a determination that the UE 102 has moved from a first location (see FIG. 1A) to a second location (see FIG. 1B) covered by a different set of Node Bs than the first location. Moreover, in some examples, receiving the tracked location of the UE 102 can include identifying the UE 102 based on the mapping of the MAC address of the UE with the C-RNTI of the UE 102.

Figure 4:
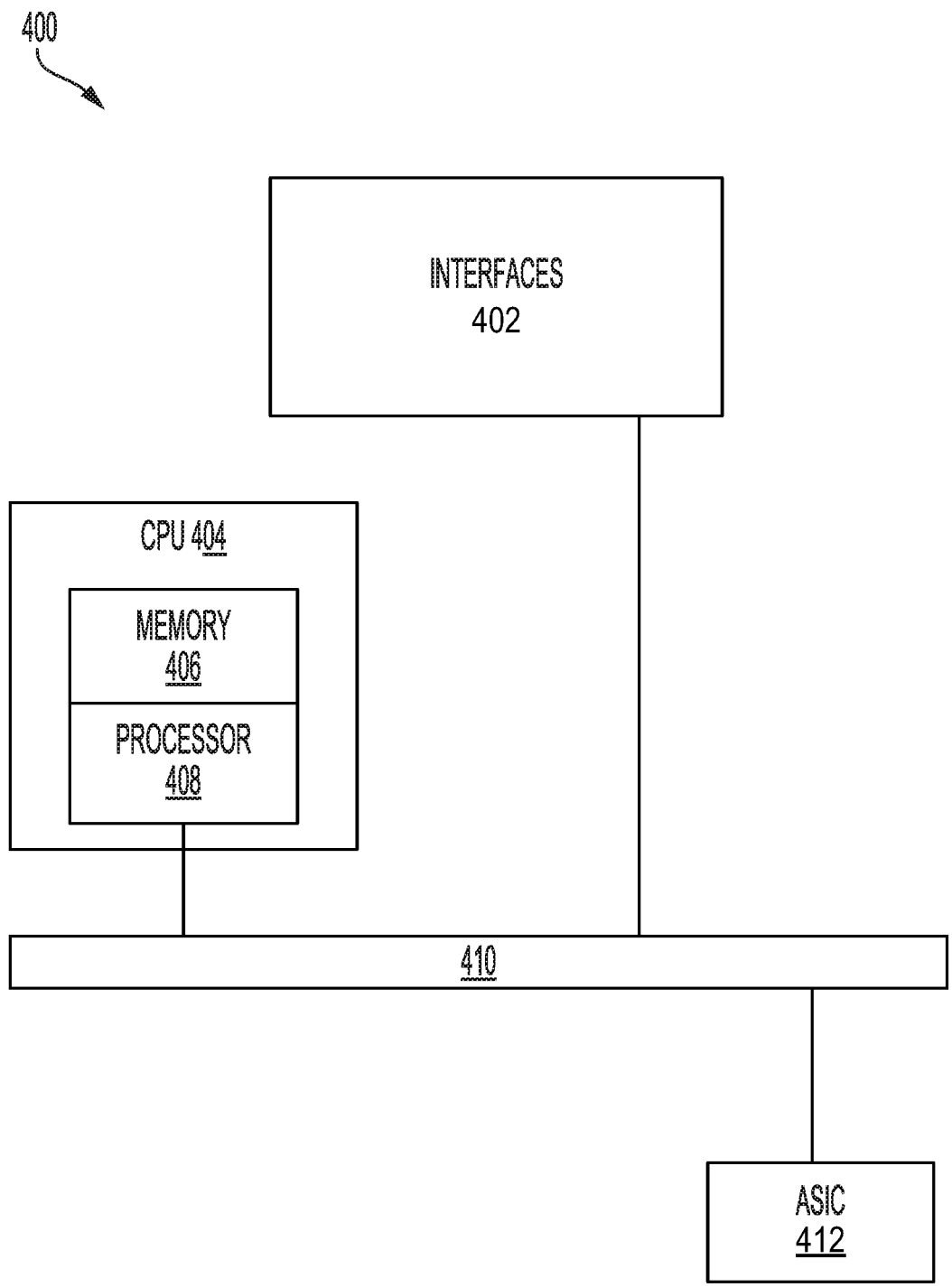
FIG. 4 illustrates an example computing system architecture for use in network of FIGS. 1A and 1B, according to an aspect of the present disclosure.
Figure 5:
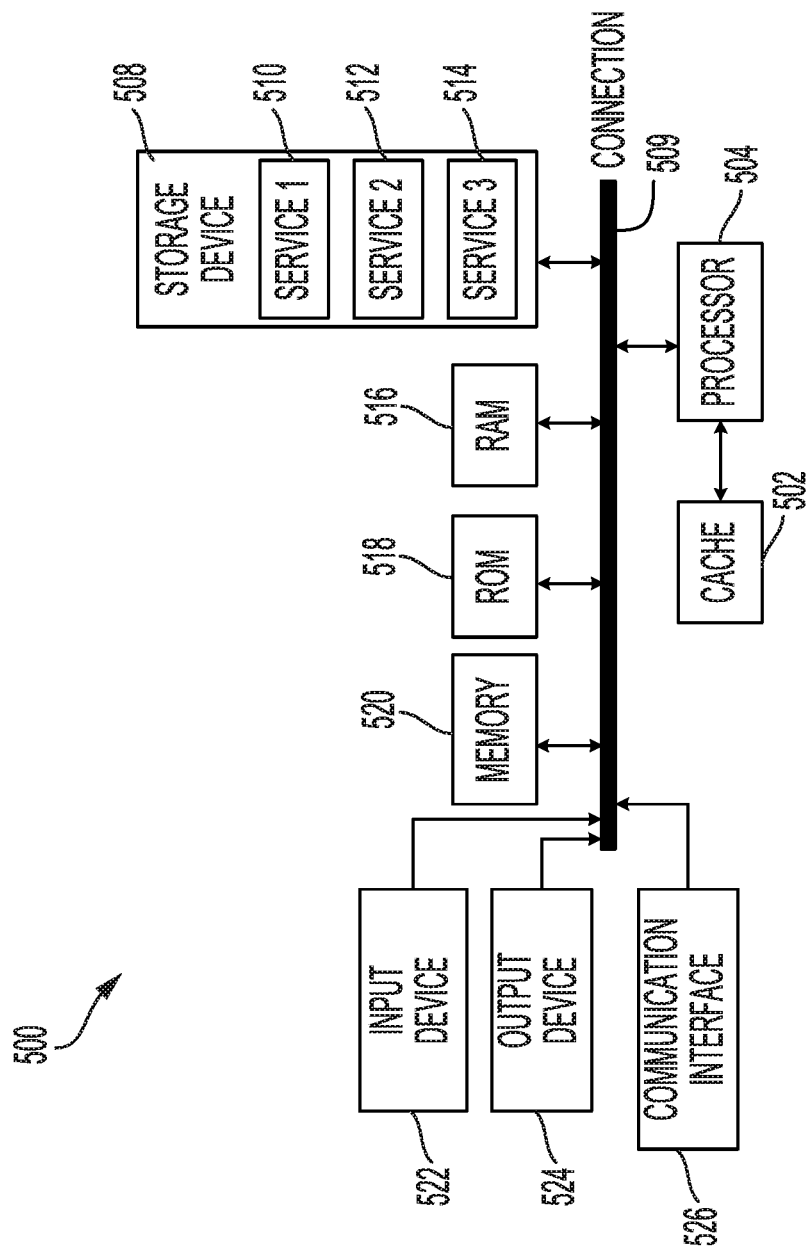
FIG. 5 illustrates an example network device suitable for performing switching, routing, load balancing, and other networking operations, according to an aspect of the present disclosure.

The disclosure now turns to FIGS. 4 and 5, which illustrate example network nodes and computing devices, such as switches, routers, client devices, endpoints, servers, and so forth, which may be implemented as one or more components of networks 100A and 100B described above including, but not limited to, any one of UE 102, serving Node B 104, neighboring Node Bs 106, etc.

FIG. 4 illustrates an example network device 400 suitable for performing switching, routing, and other networking operations. Network device 400 includes a central processing unit (CPU) 404, interfaces 402, and a connection 410 (e.g., a PCI bus). When acting under the control of appropriate software or firmware, the CPU 404 is responsible for executing packet management, error detection, and/or routing functions. The CPU 404 can accomplish these functions under the control of software including an operating system and any appropriate applications software. CPU 404 may include one or more processors 408, such as a processor from the INTEL X86 family of microprocessors. In some cases, processor 408 can be specially designed hardware for controlling the operations of network device 400. In some cases, a memory 406 (e.g., non-volatile RAM, ROM, etc.) also forms part of CPU 404. However, there are many different ways in which memory could be coupled to the system.

The interfaces 402 are typically provided as modular interface cards (sometimes referred to as "line cards"). Generally, they control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 4 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 400.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 400 can also include an application-specific integrated circuit (ASIC) 412, which can be configured to perform routing and/or switching operations. The ASIC 412 can communicate with other components in the network device 400 via the connection 410, to exchange data and signals and coordinate various types of operations by the network device 400, such as routing, switching, and/or data storage operations, for example.

FIG. 5 illustrates a computing system architecture 500 including various components in electrical communication with each other using a connection 506, such as a bus. Example system architecture 500 includes a processing unit (CPU or processor) 504 and a system connection 506 that couples various system components including the system memory 520, such as read only memory (ROM) 518 and random access memory (RAM) 516, to the processor 504. The system architecture 500 can include a cache 502 of high-speed memory connected directly with, in close proximity to, or integrated as part of the processor 504. The system architecture 500 can copy data from the memory 520 and/or the storage device 508 to the cache 502 for quick access by the processor 504. In this way, the cache can provide a performance boost that avoids processor 504 delays while waiting for data. These and other modules can control or be configured to control the processor 504 to perform various actions.

Other system memory 520 may be available for use as well. The memory 520 can include multiple different types of memory with different performance characteristics. The processor 504 can include any general purpose processor and a hardware or software service, such as service 1 510, service 2 512, and service 3 514 stored in storage device 508, configured to control the processor 504 as well as a special-purpose processor where software instructions are incorporated into the actual processor design. The processor 504 may be a completely self-contained computing system, containing multiple cores or processors, a bus, memory controller, cache, etc. A multi-core processor may be symmetric or asymmetric.

To enable user interaction with the computing system architecture 500, an input device 522 can represent any number of input mechanisms, such as a microphone for speech, a touch-sensitive screen for gesture or graphical input, keyboard, mouse, motion input, speech and so forth. An output device 524 can also be one or more of a number of output mechanisms known to those of skill in the art. In some instances, multimodal systems can enable a user to provide multiple types of input to communicate with the computing system architecture 500. The communications interface 526 can generally govern and manage the user input and system output. There is no restriction on operating on any particular hardware arrangement and therefore the basic features here may easily be substituted for improved hardware or firmware arrangements as they are developed.

Storage device 508 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 516, read only memory (ROM) 518, and hybrids thereof.

The storage device 508 can include services 510, 512, 514 for controlling the processor 504. Other hardware or software modules are contemplated. The storage device 508 can be connected to the system connection 506. In one aspect, a hardware module that performs a particular function can include the software component stored in a computer-readable medium in connection with the necessary hardware components, such as the processor 504, connection 506, output device 524, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer-implemented method comprising:
   providing, by a serving Node B, a media access control (MAC) address to a Wi-Fi Positioning System (WPS) associated with a Wi-Fi Access Point;
   subsequent to the providing the MAC address, subscribing, by the serving Node B, with the WPS, to receive one or more tracked locations of a User Equipment (UE) associated with the MAC address, the Wi-Fi Access Point being co-located relative to and in wireless communication with the Serving Node B;
   receiving, from the WPS, a tracked location of the UE;
   determining, by the serving Node B, a list of current neighboring Node Bs based on the tracked location of the UE, the list of current neighboring Node Bs comprising one or more Node Bs located within a threshold proximity to the UE;
   pruning, by the serving Node B and based on the list of current neighboring node Bs, a list of neighboring node Bs available at the serving Node B by excluding one or more Node Bs that operate in a frequency or channel that is different than frequencies or channels of neighboring Node Bs in the list of current neighboring Node Bs; and
   providing a pruned list of neighboring Node Bs or associated frequencies to the UE.

2. The computer-implemented method of claim 1 further comprising:
   providing, by the serving Node B to the UE, a C-RNTI (Cell Radio Network Temporary Identifier) when the UE connects to the serving Node B; and
   receiving, from the UE, a mapping between the MAC address of the UE and the C-RNTI of the UE prior to subscribing to the tracked location of the UE.

3. The computer-implemented method of claim 2, wherein subscribing to the tracked location is based on providing the MAC address to the WPS.

4. The computer-implemented method of claim 2, wherein subscribing to the tracked location is based on providing the C-RNTI to the WPS, wherein the WPS keeps track of the MAC address with respect to the UE.

5. The computer-implemented method of claim 2, wherein determining the list of current neighboring Node Bs, pruning the list of neighboring node Bs available at the serving Node B, and providing the pruned list of neighboring Node Bs is in response to a determination that the UE has moved from a first location to a second location covered by a different set of Node Bs than the first location, and wherein receiving the tracked location of the UE comprises identifying the UE based on the mapping between the MAC address of the UE and the C-RNTI of the UE.

6. The computer-implemented method of claim 1, wherein the threshold proximity is less than a service range of the Serving Node B.

7. The computer-implemented method of claim 1, wherein subscribing to the tracked location depends on the list of neighboring node Bs available at the serving Node B comprising more than a threshold number of Node Bs with different frequencies.

8. A non-transitory computer-readable storage medium storing instructions that, when executed by one or more processors, cause the one or more processors to:
   provide, by a serving Node B, a media access control (MAC) address to a Wi-Fi Positioning System (WPS) associated with a Wi-Fi Access Point;
   subsequent to the providing the MAC address, subscribe, by the serving Node B, with the WPS, to receive one or more tracked locations of a User Equipment (UE) associated with the MAC address, the Wi-Fi Access Point being co-located relative to and in wireless communication with the Serving Node B;
   receive, from the WPS, a tracked location of the UE;
   determine, by the serving Node B based on the tracked location of the UE, a list of current neighboring Node Bs, the list of current neighboring Node Bs comprising one or more of Node Bs located within a threshold proximity to the UE;
   prune, based on the list of current neighboring node Bs, a list of neighboring node Bs available at the serving Node B by excluding one or more Node Bs that operate in a frequency or channel that is different than frequencies or channels of neighboring Node Bs in the list of Neighboring Node Bs; and
   provide a pruned list of neighboring Node Bs or associated frequencies to the UE.

9. The non-transitory computer-readable storage medium of claim 8, wherein the instructions further cause the one or more processors to:
provide, by the serving Node B to the UE, a C-RNTI (Cell Radio Network Temporary Identifier) when the UE connects to the serving Node B; and
receive, from the UE, a mapping between the MAC address of the UE with the C-RNTI of the UE prior to to the tracked location of the UE.

10. The non-transitory computer-readable storage medium of claim 9, wherein subscribing to the tracked location is based on providing the MAC address to the WPS.

11. The non-transitory computer-readable storage medium of claim 9, wherein subscribing to the tracked location is based on providing the C-RNTI to the WPS, wherein the WPS keeps track of the MAC address with respect to the UE.

12. The non-transitory computer-readable storage medium of claim 9, wherein determining the list of current neighboring Node Bs, pruning the list of neighboring node Bs available at the serving Node B, and providing the pruned list of neighboring Node Bs is in response to a determination that the UE has moved from a first location to a second location covered by a different set of Node Bs than the first location, and wherein receiving the tracked location of the UE comprises identifying the UE based on the mapping between the MAC address of the UE and the C-RNTI of the UE.

13. The non-transitory computer-readable storage medium of claim 8, wherein the threshold proximity is less than a service range of the Serving Node B.

14. The non-transitory computer-readable storage medium of claim 8, wherein subscribing to the tracked location depends on the list of neighboring node Bs available at the serving Node B comprising more than a threshold number of Node Bs with different frequencies.

15. A system, comprising:
one or more processors; and
memory including instructions that, when executed by the one or more processors, cause the one or more processors to:
provide, by a serving Node B, a media access control (MAC) address to a Wi-Fi Positioning System (WPS) associated with a Wi-Fi Access Point;
subsequent to the providing the MAC address, subscribe, by the serving Node B, with the WPS, to receive one or more tracked locations of a User Equipment (UE) associated with the MAC address, the Wi-Fi Access Point being co-located relative to and in wireless communication with the Serving Node B;
receive, from the WPS, a tracked location of the UE;
determine, by the serving Node B based on the tracked location of the UE, a list of current neighboring Node Bs, the list of current neighboring Node Bs comprising one or more Node Bs located within a threshold proximity to the UE;
prune, based on the list of current neighboring node Bs, a list of neighboring node Bs available at the serving Node B by excluding one or more Node Bs that operate in a frequency or channel that is different than frequencies or channels of neighboring Node Bs in the list of current neighboring Node Bs; and
provide a pruned list of neighboring Node Bs or associated frequencies to the UE.

16. The system of claim 15, wherein the memory includes further instructions that cause the one or more processors to:
provide, by the serving Node B to the UE, a C-RNTI (Cell Radio Network Temporary Identifier) when the UE connects to the serving Node B; and
receive, from the UE, a mapping between the MAC address of the UE with the C-RNTI of the UE prior to subscribing to the tracked location of the UE.

17. The system of claim 16, wherein subscribing to the tracked location is based on providing the MAC address to the WPS.

18. The system of claim 16, wherein subscribing to the tracked location is based on providing the C-RNTI to the WPS, wherein the WPS keeps track of the MAC address with respect to the UE.

19. The system of claim 16, wherein determining the list of neighboring Node Bs, pruning the list of neighboring node Bs available at the serving Node B, and providing the pruned list of neighboring Node Bs is in response to a determination that the UE has moved from a first location to a second location covered by a different set of Node Bs than the first location, and wherein receiving the tracked location of the UE comprises identifying the UE based on the mapping between the MAC address of the UE and the C-RNTI of the UE.

20. The system of claim 15, wherein subscribing to the tracked location depends on the list of neighboring node Bs available at the serving Node B comprising more than a threshold number of Node Bs with different frequencies.

* * * * *